Oct. 3, 1967     O. A. KERSHNER     3,345,112
BRAKE EQUALIZER VALVE
Filed Feb. 7, 1966                                       2 Sheets-Sheet 2
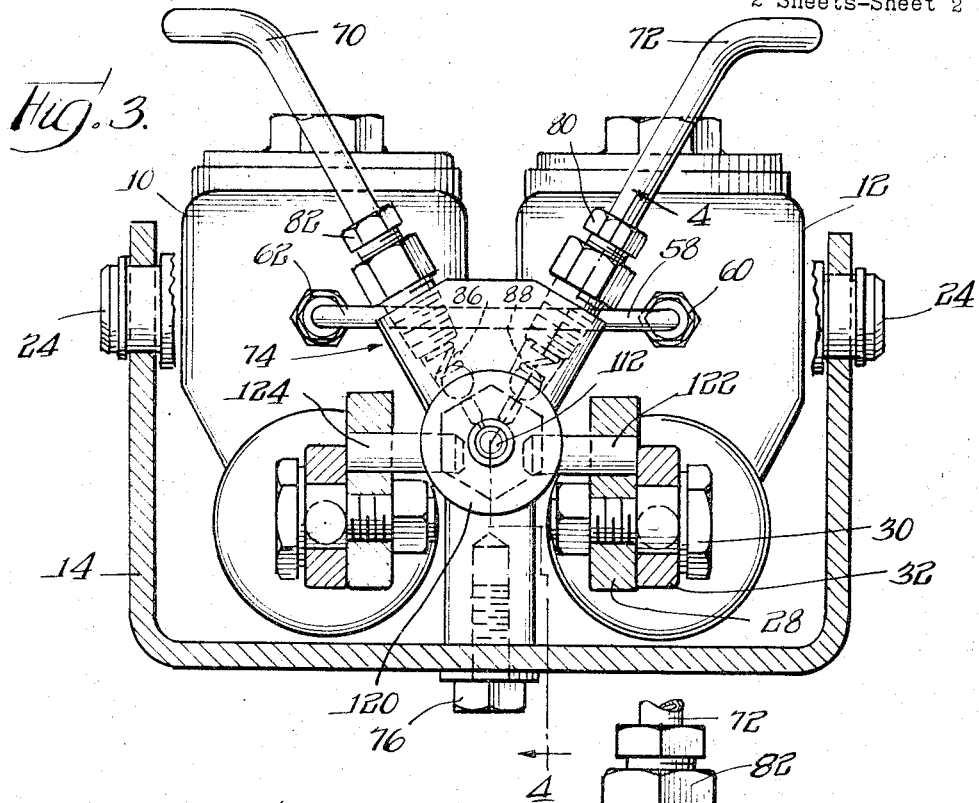
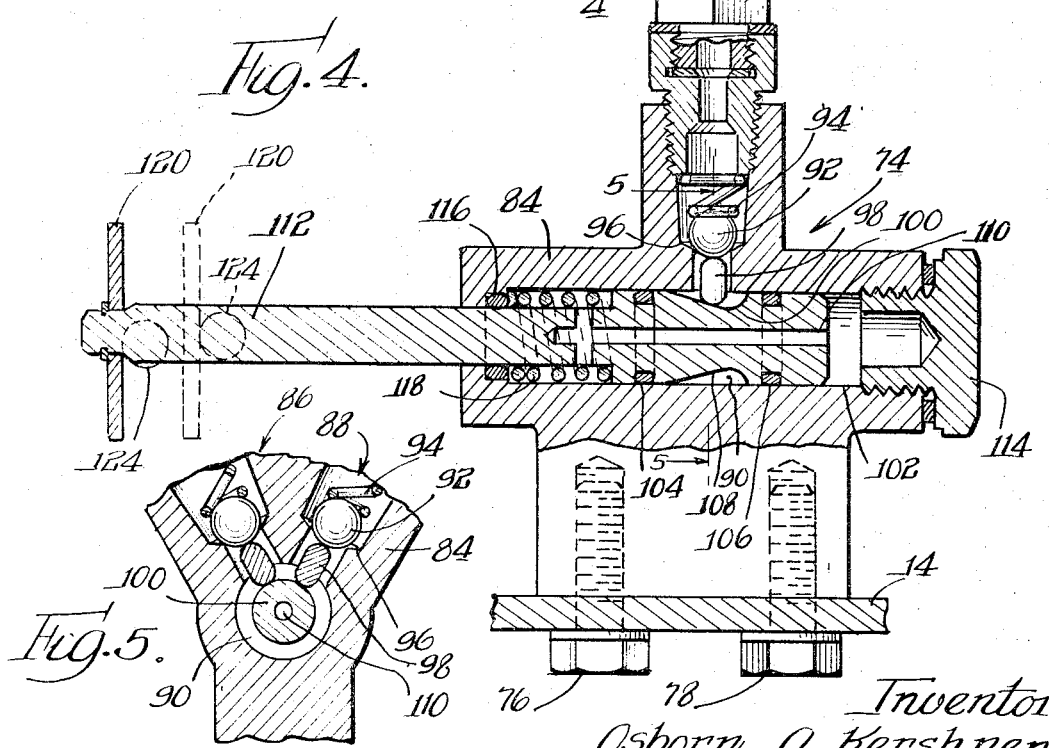
Inventor
Osborn A. Kershner
By: Olson, Trexler, Wolters & Bushnell attys 3,345,112
BRAKE EQUALIZER VALVE
Osborn A. Kershner, St. Joseph, Mich., assignor, by mesne assignments, to Lambert Brake Corporation, St. Joseph, Mich., a corporation of Michigan
Filed Feb. 7, 1966, Ser. No. 525,429
6 Claims. (Cl. 303—6)

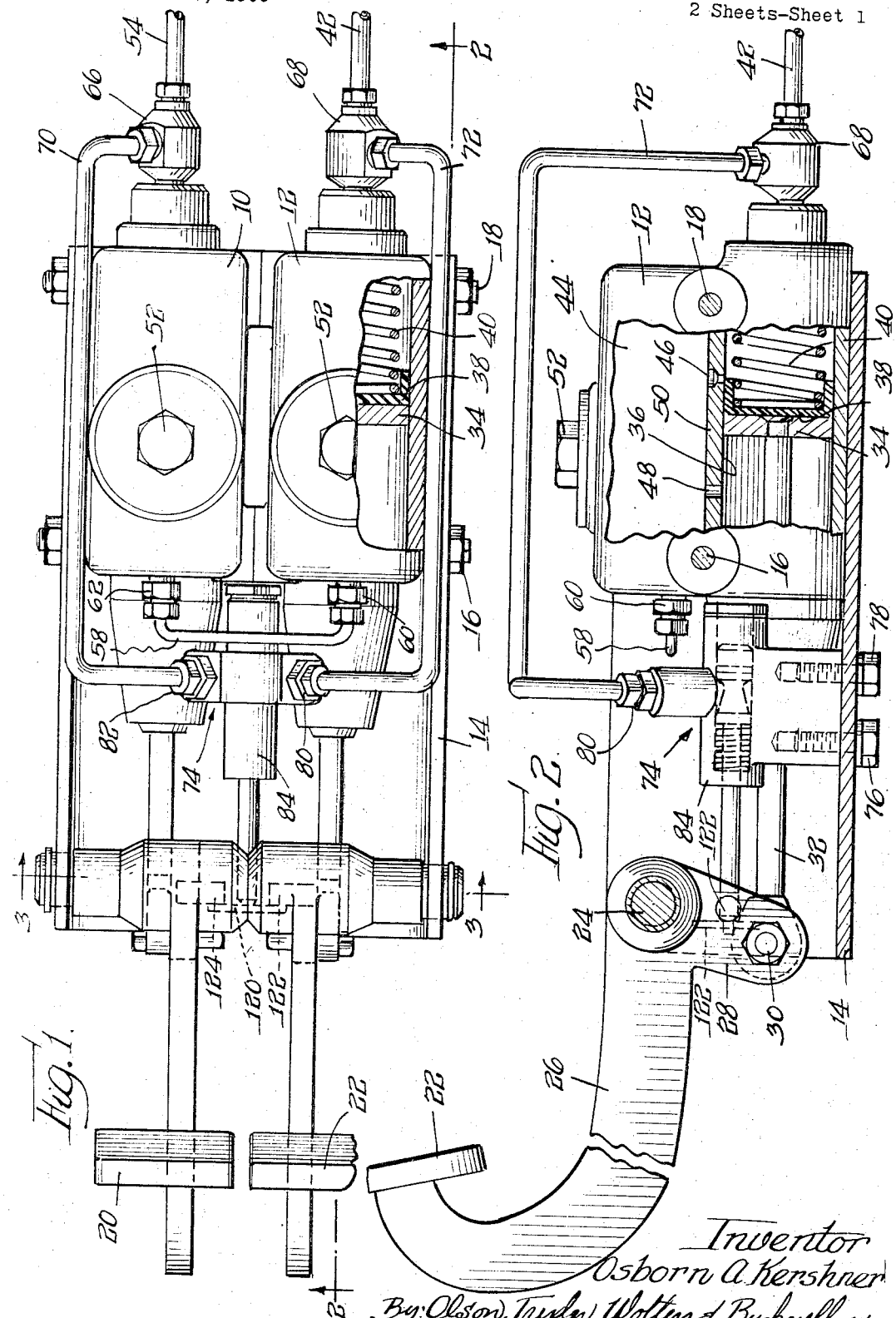

This invention relates to a brake system, and more particularly to a brake system for a vehicle which utilizes two or more independent brake systems.

It is common in tractors, airplanes, and other vehicles to utilize two or more independent brake systems to control the movement of the vehicle. Each of the independent brake systems is designed to be operated separately or simultaneously with the other brake system. Since the brake systems are independent of each other, one brake will invariably be subjected to more usage and greater wear than the others. The brake system which has received the most wear and usage will require more pedal or lever travel to actuate than the other brake systems.

When two or more brake systems are actuated simultaneously, the brake which requires the least pedal travel will be engaged first. The engagement of one brake system before the other will cause uneven braking and result in a swerving of the vehicle. The danger in the use of a brake system which causes a vehicle to swerve when applied, is readily apparent.

Therefore, one of the objects of this invention is to provide a novel means for operating two or more independent brake systems at the same time with uniform engagement of the independent brake systems.

Another object of this invention is to provide a novel means for equalizing the pedal travel of two independent brake systems when they are actuated simultaneously.

Another object of this invention is to provide a novel means for equalizing the fluid pressure in two or more independent brake systems when they are actuated simultaneously.

Another object of this invention is to provide a novel means which can be readily attached to existing brake systems for uniformly actuating two or more independent brake systems simultaneously.

Another object of this invention is to provide a novel means which can be economically made for actuating two or more independent brake systems uniformly and simultaneously.

For a fuller understanding of the nature and objects of the invention, reference should be had to the following detailed description taken in connection with the accompanying drawings wherein:

FIG. 1 is a plan view of the brake system;

FIG. 2 is a side elevational view of the brake system taken along the line 2—2 of FIG. 1;

FIG. 3 is a detailed end view of the brake system taken along the line 3—3 of FIG. 1;

FIG. 4 is a detailed sectional view of the equalizer valve assembly taken along the line 4—4 of FIG. 3; and FIG. 5 is a detailed view of the valve means utilized in the equalizer valve assembly, taken along the line 5—5 of FIG. 4.

Referring now to the drawings in greater detail, a master cylinder assembly for two independent brake systems is shown in FIG. 1. A left master cylinder 10 and a right master cylinder 12 are supported from a yoke frame 14 (see FIG. 3) by studs or bolts 16 and 18 which extend through both master cylinders 10 and 12 to support them on the yoke frame 14. The two master cylinders 10 and 12 are similar to those commonly used in automobiles, tractors, or other vehicles.

The left master cylinder 10 is actuated by pedal 20 and the right master cylinder 12 is actuated by pedal 22. Both of the pedals 20 and 22 are pivoted from a shaft 24 which is connected to the yoke frame 14, as is best shown in FIG. 3. The pedal 22 has a lever 26 extending from the pedal to the shaft 24 (see FIG. 2). Lever 28 extends downwardly from the shaft 24 and is connected by a bolt 30 to an end of pushrod 32. The pushrod 32 extends into the master cylinder 12 and is connected to a piston 34 in a chamber or cylinder 36 of the master cylinder 12. When the pedal 22 is depressed, the lever 28 will pivot about the shaft 24 and cause the pushrod 32 to move the piston 34 to the right, as viewed in FIG. 2.

The piston 34 has a seal 38 connected to the forward or head end of the piston. The seal 38 seals the joint between the edge of the piston and the walls of the cylinder 36 in a known manner. The piston 34 is forced to the left, as viewed in FIG. 2, by the action of a spring 40 which presses against the seal 38 and the forward end of the cylinder or chamber 36. The spring member 40 will cause the piston and pushrod member 32 to move the brake pedal 22 to the position shown in FIG. 2 when the brake pedal 22 is not being actuated.

A brake line or conduit 42 is connected to the right end of the master cylinder 12. When the piston 34 is moved to the right, when the brake pedal 22 is depressed, hydraulic fluid between the piston head and seal 38 and the end of the chamber or cylinder 36 will be forced into the brake line or conduit 42 to actuate the vehicle brakes. The brake itself has not been shown, since any known hydraulic brake mechanism can be connected to the brake line 42 to stop, or otherwise control, the motion of the vehicle.

A chamber or reservoir 44 for brake fluid is located above the chamber or cylinder 36. The fluid from the chamber or reservoir 44 flows into the chamber 36 through an aperture 46 in the bottom wall of the chamber or reservoir 44. When the piston 34 is forced to the right by depression of the brake pedal 22 the seal 38 will seal the aperture 46 so that brake fluid will be forced into the brake line or conduit 42 rather than upward into the fluid chamber or reservoir 44. A second aperture 48 in base wall 50 of the chamber or reservoir 44 permits any fluid which leaks past the seal 38 to be returned to the chamber or reservoir 44 when the brake pedal 22 is released. The chamber or reservoir 44 may be filled with brake fluid by removing cover 52 from the top of the reservoir.

The master cylinder 10 is of the same construction as the master cylinder 12. Thus, when the brake pedal 20 is depressed, a piston within the master cylinder 10 will force brake fluid into the brake line or conduit 54 to a brake assembly associated with the master cylinder 10. Since the connection means for the brake pedal 20 to the master cylinder 10 and the construction of the master cylinder 10 are the same as those utilized for the master cylinder 12, a detailed description of the master cylinder 10 and the connection means for the brake pedal 20 is not believed to be necessary. It should be noted that both master cylinders 10 and 12 are of the type which are normally utilized in brake systems for tractors, airplanes, or other vehicles.

The fluid reservoir 44 for the master cylinder 12 is connected by a reservoir connecting line or conduit 58 (see FIG. 1) to the fluid chamber or reservoir for the master cylinder 10. It should be noted that the reservoir connecting line or conduit 58 is connected to the exterior of the master cylinders 10 and 12 by two fittings 60 and 62 which are connected to a drilled and tapped hole in the wall of the reservoirs. The reservoir connecting line or conduit 58 will maintain the reserve brake fluid in both reservoirs at the same level. It will be apparent that the reservoir connecting line 58 could be easily connected to two standard master cylinders in an existing vehicle.

The two brake lines 42 and 54 are connected to the left and right master cylinders by T connections 66 and 68. The connections 66 and 68 have equalizer lines or conduits 70 and 72 connected thereto. The equalizer line or conduit is connected to an equalizer valve assembly 74 which is connected to the base of the yoke frame 14 by bolts 76 and 78. The equalizer lines of conduits 70 and 72 are connected to the equalizer valve assembly 74 by connections 80 and 82 to housing 84 of the equalizer valve assembly. It will be apparent that the connections 66 and 68, the equalizer lines 70 and 72, and the equalizer valve assembly 74 could be connected to the master cylinders of any vehicle presently in use to adapt the vehicle for the installation of the present invention.

The equalizer valve assembly is located within a housing 84 (see FIGS. 4 and 5) and includes two valve mechanisms 86 and 88. The valve mechanism 86 control the flow of fluid through the conduit 70 to the equalizer valve assembly. The valve mechanism 88 controls the flow of fluid through the conduit 72, from the brake line or conduit 42, to the equalizer valve assembly. When the valves 86 and 88 are open, the equalizer lines or conduits 70 and 72 are connected by a passage 90 within the equalizer valve assembly housing 84. It will be apparent that when the two valves 86 and 88 are open, the fluid pressure in the equalizer liner tube 70 will be the same as the fluid pressure within the equalizer line 72, since the passage 90 will permit fluid communication between the two lines. Therefore, the fluid pressure in the brake line 42 will, due to the effect of the equalizer valve assembly, be the same as the fluid pressure in the brake line or conduit 54. The separate brake mechanisms connected to the brake lines 54 and 42 would then be actuated with the same force.

The valve 88 includes a ball member 92 which is forced by spring 94 to be positioned on a seat 96. When the ball 92 is in engagement with the seat 96 the fluid cannot flow from the line 72 into the passage 90. The ball 92 is raised from the seat 96 by a plunger 98 which contacts cam member 100. The cam member 100, when forced to the left, raises the plunger 98 to contact the ball 92 and thereby open the valve 88 to provide fluid communication between the equalizer or conduit 72 and the passage 90 within the equalizer valve assembly housing (see FIG. 4). The construction and operation of the valve 86 are the same as those for the valve 88. A further description of valve 86 is not, therefore, believed to be necessary.

As will be seen from FIG. 5, the cam member 100 is substantially circular in cross section. Thus, the plungers 98 for both the valves 86 and 88 will be forced upward to open both of the valves 86 and 88 when the cam member 100 is moved to the right of the position shown in FIG. 4. It will be apparent that the two valves 86 and 88 will open substantially simultaneously to provide fluid communication between the two equalizer lines or conduits 70 and 72 whenever the cam member 100 is moved to the right.

The cam member 100 slides in a cylinder or chamber 102 of the equalizer valve assembly housing 84. The cam member 100 has a pair of O-ring seals 104 and 106 placed at opposite end portions of the cam member 100. The seals 104 and 106 seal the joint between the walls of the cylinder 102 and the cam member 100. The passage 90 is located intermediate the two seals 104 and 106 and is defined by the walls of the cylinder 102 and cam surface 108 of the cam member 100. The cam member 100 has a lengthwise hole or bore 110 which provides fluid communication between the two end portions of the cam member 100. It will be apparent that, when the cam member 100 is forced to the right by rod 112, the fluid between the end of the cam member 100 and plug 114, for the cylinder 102, will flow through the hole or bore 110 to the opposite end of the cylinder 102.

A rod 112, which is integrally connected with the cam member 100, is utilized to move the cam member 100. The joint between the rod 112 and the equalizer valve assembly housing 84 is sealed by an O-ring 116. A spring member 118 tends to force the rod 112 and cam member 100 to the right. As will be explained in greater detail subsequently, the spring 118 cannot push the cam member 100 to the right until both brake pedals 20 and 22 have been depressed.

The rod 112 has a washer 120 connected to its end. The washer 120 is positioned ahead of two pins 122 and 124 which are connected to the lever 28 which is pivoted around the shaft 24 (see FIGS. 1 and 3). When the pedal 24 is depressed, the pin 124 will swing from a position adjacent the rear surface of the washer 120 to the position shown in dotted lines in FIG. 4. However, the rod 112 will remain in the position shown in FIGS. 1 and 2, since the pin 122 will still be positioned against the rear surface of the washer 120 and will retain the rod 112 against rearward movement. It should be noted that the spring 40, which forces the pedals to the position shown in FIG. 2, is a relatively stiff spring. Thus the relatively weak spring 118 will not pull the pedal 22 to the actuated position.

When both pedals 20 and 22 are depressed against their respective springs 40, both pins 122 and 124 will swing rearwardly and the rod 112 will move to the right under the action of the spring 118. When the rod 112 has moved to the right, the plunger 98 will be raised by the cam surface 108 and will open both valves 86 and 88. When the two brake pedals 20 and 22 are both depressed, the valves 86 and 88 will open to provide fluid communication between the two equalizer lines or conduits 70 and 72 and the two brake lines 42 and 54. Thus, the fluid pressure in the brake line 42 will be the same as the fluid pressure in the brake line 54 when both pedals are depressed.

For purposes of affording a more complete understanding of the invention it is advantageous now to provide a functional description of the mode in which the component parts thus far identified cooperate. When one of the brake pedals 20 or 22 is depressed, the pin 122 or 124 is connected to the other brake pedal and will retain the washer and rod 112 in the position shown in FIG. 1. With the rod 112 in the position shown in FIG. 1, the two valves 86 and 88 will remain closed. There will be no fluid connection between the two brake lines or conduits 42 and 54, only the pressure in the brake line connected to the actuated brake cylinder will be increased. Since the pressure in only one of the two brake lines 42 or 54 will be raised, the brake mechanism connected to that line will be actuated to slow down or otherwise change the motion of the vehicle.

When both brake pedals 20 and 22 are depressed, the two pins 122 and 124 will swing rearwardly and permit the shaft 112 to move to the rear or right, as seen in FIG. 4. The shaft or rod 112 will move to the right, as seen in FIG. 4, and the two valves 86 and 88 will be opened by the action of the cam surface 108 on the plungers 98. Since there will be a fluid connection between the two equalizer lines 70 and 72, the fluid pressure in both brake lines 42 and 54 will be equalized. Thus, the brake mechanisms connected to both brake lines or conduits 42 or 54 will be actuated uniformly by the same amount of hydraulic pressure and the vehicle will come to a smooth stop without swerving.

When either one of the two brake pedals 20 or 22 is released, the pin 122 or 124 of the released brake pedal will cause the washer 120 and rod 112 to be moved to the normal position. This will cause the cam surface 108 to move to the left as seen in FIG. 4, and the two valves 86 and 88 will then close. When the two valves 86 and 88 have closed, only the brake mechanism connected to the brake line or conduit associated with the actuated or depressed brake pedal will be engaged.

It will be apparent that the equalizer lines of tubes and the equalizer valve assembly can be connected to existing master cylinders in tractors, airplanes, or other vehicles presently in use. To adapt existing vehicles for the use of my invention, it will merely be necessary to install two connections (66 and 68) to the existing master cylinders and to attach an equalizer valve assembly (74) to the two T connections. The installation of the reservoir connecting line or conduit 58 is not mandatory in order to have a functioning system. However, it is desirable, since the reserve fluid of one brake cylinder can then be used to feed the other cylinder.

While particular embodiments of the invention have been shown, it should be understood, of course, that the invention is not limited thereto, since many modifications may be made; and it is, therefore, contemplated to cover by the appended claims any such modifications as fall within the true spirit and scope of the invention.

What is claimed is:

1. A brake system for a vehicle comprising first and second brake means, first master cylinder means for actuating said first brake means by fluid pressure, second master cylinder means for actuating said second brake means by fluid pressure, first chamber means within said first master cylinder means, second chamber means in said second master cylinder means, first fluid conduit means interconnecting said first brake means and said first chamber means, second fluid conduit means interconnecting said second brake means and said second chamber means, first piston means in said first chamber means to establish fluid pressure in said first fluid conduit means to actuate said first brake means, second piston means in said second chamber means to establish fluid pressure in said second fluid conduit means to actuate said second brake means, first and second independently operable actuating means respectively operatively connected with said first and second piston means, third fluid conduit means connected to said first fluid conduit means, fourth fluid conduit means connected to said second fluid conduit means, and an equalizer valve assembly connected to said third and fourth fluid conduit means, said equalizer valve assembly including a first normally closed valve for normally preventing flow of fluid from said third conduit means toward said fourth conduit means, a second normally closed valve for normally preventing flow of fluid from said fourth conduit means toward said third conduit means, and means for simultaneously opening both of said valves in response to simultaneous operation of said first and second actuating means for interconnecting said third and fourth conduit means to equalize the fluid pressure in said first and second fluid conduit means when both said first and second brake means are actuated, said first and second valves of said equalizer valve assembly including a first spring biased check valve and a second spring biased check valve, and said means for opening said valves comprises cam means for substantially simultaneously actuating said first and second check valves.

2. A brake system as set forth in claim 1 wherein said first and second master cylinder means further includes a first fluid reservoir means connected to said first chamber means, a second fluid reservoir means connected to said second chamber means, and fluid connection means interconnecting said first and second fluid reservoir means to equalize the fluid level in said first and second fluid reservoir means.

3. A brake system as set forth in claim 1 wherein said means for actuating said piston means comprises a first pushrod means connected to said first piston means, a second pushrod means connected to said second piston means, and said means for opening said valves includes an equalizer valve assembly actuator rod connected to said cam means, said equalizer valve assembly actuator rod being operatively connected to said first and second pushrod means so that said first and second valve means will be open only when both said first and second piston means have been moved relative to said first and second chamber means.

4. In a brake system for a vehicle having a first and second brake means connected to said vehicle, the combination comprising a first master cylinder assembly for controlling said first brake means, a second master cylinder assembly for controlling said second brake means, first fluid conduit means connected to said first master cylinder assembly for connection to said first brake means, second fluid conduit means connected to said second master cylinder assembly for connection to said second brake means, an equalizer valve assembly, third fluid conduit means separate from said master cylinder assemblies and connected to said first conduit means and to said equalizer valve assembly, and fourth fluid conduit means separate from said master cylinder assemblies and conected to said second fluid conduit means and to said equalizer valve assembly, said equalizer valve assembly comprising first and second valves respectively normally preventing flow of fluid in opposite directions between said third and fourth conduit means, and actuating means including means for opening both of said valves only when both of said master cylinder assemblies are actuated to equalize the fluid pressure in said first and second conduit means when said first and second brake means are both being actuated, said equalizer valve assembly including an assembly housing, said first and second valves being located in said housing, said actuating means including cam means positioned in said assembly housing for movement relative to said assembly housing from a first position to a second position, first plunger means between said cam means and said first valve to open said first valve when said cam means is in said second position, and second plunger means between said cam means and said second valve to open said second valve when said cam means is in said second position.

5. In a brake system as set forth in claim 4 wherein said equalizer valve assembly is spaced apart from said first and second master cylinder assembly.

6. In a brake system as set forth in claim 4 further including fluid conduit means connected to and spaced-apart from said first and second master cylinder assemblies to equalize the fluid level in said first and second master cylinder assemblies.

References Cited

UNITED STATES PATENTS

| | | | |
|---|---|---|---|
| 1,894,741 | 1/1933 | Hartog | 137—614.11 |
| 2,625,410 | 1/1953 | Crowley | 137—614.06 |
| 3,064,434 | 11/1962 | Parrett | 188—152.02 XR |
| 3,120,244 | 2/1964 | Hahn | 137—512.5 |

EUGENE G. BOTZ, *Primary Examiner.*